US010013940B2

(12) United States Patent
Wyatt

(10) Patent No.: US 10,013,940 B2
(45) Date of Patent: Jul. 3, 2018

(54) METHOD AND APPARATUS TO REDUCE PANEL POWER THROUGH HORIZONTAL INTERLACED ADDRESSING

(71) Applicant: NVIDIA Corporation, Santa Clara, CA (US)

(72) Inventor: David Wyatt, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 234 days.

(21) Appl. No.: 13/731,700

(22) Filed: Dec. 31, 2012

(65) Prior Publication Data

US 2014/0184583 A1 Jul. 3, 2014

(51) Int. Cl.
*G06F 3/038* (2013.01)
*G09G 3/36* (2006.01)

(52) U.S. Cl.
CPC ......... *G09G 3/3666* (2013.01); *G09G 3/3614* (2013.01); *G09G 2320/103* (2013.01); *G09G 2360/08* (2013.01)

(58) Field of Classification Search
CPC ............. G09G 3/3614; G09G 2360/08; G09G 2320/103
USPC .................................................. 345/87, 214
See application file for complete search history.

(56) References Cited

U.S. PATENT DOCUMENTS 7,119,803 B2 * 10/2006 Stanley et al. ................ 345/211
8,400,605 B2 * 3/2013 Lee ............................... 349/143
2002/0063671 A1 * 5/2002 Knapp ................. G09G 3/3666 345/87
2005/0254702 A1 * 11/2005 Era ...................... H04N 13/026 382/154
2008/0278467 A1 * 11/2008 Hwang et al. ................ 345/205
2009/0295786 A1 * 12/2009 Ito et al. ....................... 345/215
2010/0007639 A1 * 1/2010 Jeong ................... G09G 3/2007 345/208
2010/0128201 A1 * 5/2010 Lee ..................... G02F 1/13452 349/62
2010/0277463 A1 * 11/2010 Yen et al. ..................... 345/213
2011/0012940 A1 * 1/2011 Lim .............................. 345/690
2011/0043546 A1 * 2/2011 Matsumoto .......... G09G 3/3611 345/690
2013/0088479 A1 * 4/2013 Kim ..................... G09G 3/3614 345/212
2013/0141423 A1 * 6/2013 Cho et al. ..................... 345/419
2014/0267370 A1 * 9/2014 Albrecht ................ G09G 5/006 345/602

* cited by examiner

*Primary Examiner* — Jonathan Blancha

(57) ABSTRACT

A method for refreshing a display. The method includes refreshing even and odd columns of a display panel at a first frame refresh rate where for each frame, even and odd columns are refreshed. Upon entering a display idle period, a low power display refresh is performed. The low power display refresh includes: refreshing the even columns of the display during even frames while circuitry driving odd columns are not used, and refreshing the odd columns of the display during odd frames while circuitry driving the even columns are not used. Refreshing the even columns and refreshing the odd columns are performed at a second frame refresh rate that is slower than the first frame refresh rate.

17 Claims, 9 Drawing Sheets

Frame N

Frame N+1

METHOD AND APPARATUS TO REDUCE PANEL POWER THROUGH HORIZONTAL INTERLACED ADDRESSING

TECHNICAL FIELD

The present disclosure relates generally to the field of power management and more specifically to the field of display panel power management.

BACKGROUND

Power consumed by a display panel can be a significant part of a computer system's overall power consumption. The power required by the display panel can become an even greater factor of overall power during periods of time when the computer system is idle. For example, in a notebook computer, the panel power can be 15-20% of idle power. In tablet systems the percentage of idle power used for panel power can be 60% or higher. A small percentage of this power is consumed in a display interface connecting a graphics processor to the display panel. For example, exemplary display interfaces, such as embedded DisplayPort (eDP) and low-voltage differential signaling (LVDS) interfaces, consume approximately 200 mW per lane and 120-150 mw for both channels in dual-channel mode, respectively. A timing controller chip (TCON) on the panel also consumes relatively little power. By far the largest amount of power consumed in a display panel are in the row/column drivers (that enable TFT gates) and source drivers (that set the sub-pixel primary color value) that charge the storage capacitors in the thin-film-transfer (TFT) elements of an LCD matrix.

In one exemplary display, each individual pixel of a display panel comprises a storage capacitor. Each storage capacitor comprises a pair of transparent electrodes with a layer of liquid crystal between the transparent electrodes. LCD drivers control and manage the display of data in the display panel as defined by the charges stored in the individual storage capacitors of the matrix of pixels. Because the charge of a capacitor will naturally decay over time, each pixel storage capacitor must be recharged by the LCD drivers to maintain the current state of the LCD pixel.

Since many idle system scenarios run the display continuously for the purpose of providing a viewer with a continuous static visual experience, e.g., while reading a webpage, text document, multi-media document, ebook reader program, etc., what is needed are ways to decrease panel power for idle static screen cases. Previous attempts to reduce panel power by reducing the refresh rate have failed to achieve a satisfactory visual experience below 40 Hz due to visual flicker artifacts, especially in fluorescent lighting, where a beat interference frequency can create a visually disturbing "strobing" effect as the LCD display panel appears to pulse. This is due to the sawtooth decay of the smaller storage capacitance used in modern LCDs. Smaller storage capacitance is necessary in order to provide low latency (e.g., fast charge times) for displaying high motion content. Changing to larger storage capacitance would reduce this effect, but at the cost of increased latency, and higher source driver power, which is unacceptable.

SUMMARY OF THE INVENTION

Embodiments of the present invention provide a solution to the challenges inherent in efficiently driving a display panel. Embodiments of the invention improve display panel power management by reducing the power requirements to drive a display panel in an idle computer system by at least fifty percent. In accordance with embodiments of the present invention, refresh rates of a display can be drastically reduced during idle events without leading to unwanted visual artifacts. According to one embodiment of the present invention, a method for refreshing a display is disclosed. The method includes refreshing even and odd columns of a display panel at a first frame refresh rate wherein for each frame, even and odd columns are refreshed. Upon entering a display idle period, a low power display refresh is performed. The low power display refresh includes: refreshing the even columns of the display during even frames while circuitry driving odd columns are not used, and refreshing the odd columns of the display during odd frames while circuitry driving the even columns are not used. Refreshing the even columns and refreshing the odd columns are performed at a second frame refresh rate that is slower than the first frame refresh rate. With a lower frame rate and only refreshing half the columns each frame, the power requirements to drive the display panel during a display idle period can be reduced.

According to one embodiment of the present invention, a computer system is disclosed. The computer system comprises a plurality of odd columns of a display panel, a plurality of even columns of the display panel, a circuitry for driving odd columns, and a circuitry for driving even columns. The computer system also includes a processor and a memory for storing instructions that when executed by the processor perform a method for refreshing a display. The method includes refreshing the even and odd columns at a first frame refresh rate wherein for each frame, even and odd columns are refreshed. Upon entering a display idle period, a low power display refresh method is performed. This low power refresh method includes: refreshing the even columns of the display during even frames while circuitry driving odd columns are not used, and refreshing the odd columns of the display during odd frames while circuitry driving the even columns are not used. The even columns and the odd columns are refreshed at a second frame refresh rate that is slower than the first frame refresh rate. With a lower frame rate and only refreshing half the columns each frame, the power requirements to drive the display panel during a display idle period can be reduced.

According to one embodiment of the present invention, a computer system is disclosed. The computer system comprises a plurality of odd columns of a display panel that are refreshed by circuitry for driving the odd columns, a plurality of columns of the display panel that are refreshed by a circuitry for driving the even columns, and an inter-frame comparator operable to detect a display idle period. For each frame even and odd columns are refreshed at a first frame refresh rate when the display idle period is not detected. Upon entering the display idle period, said even columns of said display are refreshed during even frames while the circuitry driving odd columns are not used, and the odd columns of the display are refreshed during odd frames while the circuitry driving the even columns are not used. Furthermore, the even columns and the odd columns are refreshed at a second frame refresh rate that is slower than the first frame refresh rate. With a lower frame rate and only refreshing half the columns each frame, the power requirements to drive the display panel during a display idle period can be reduced.

BRIEF DESCRIPTION OF THE DRAWINGS

The present invention will be better understood from a reading of the following detailed description, taken in conjunction with the accompanying drawing figures in which like reference characters designate like elements and in which.

DETAILED DESCRIPTION

Figure 1:
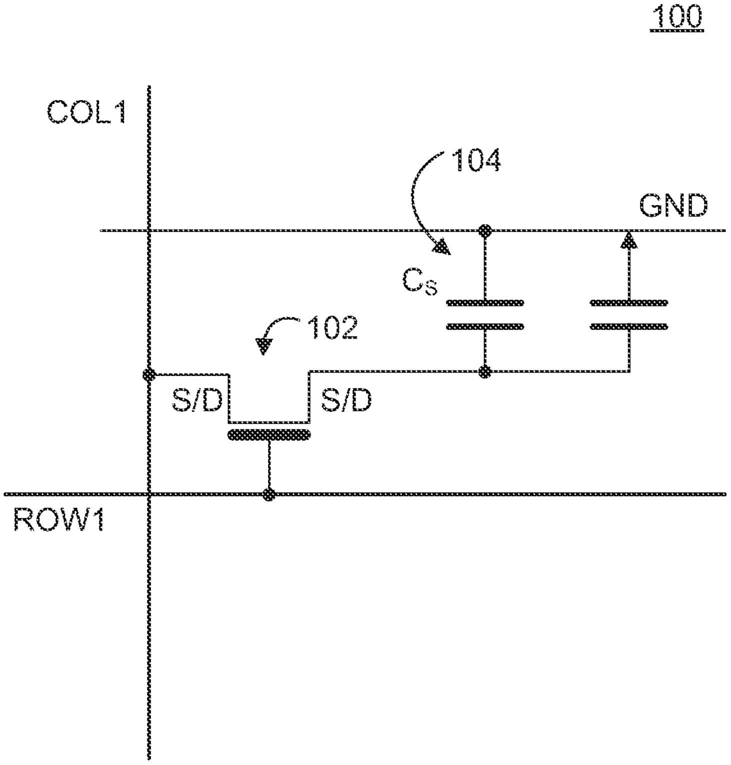
FIGURE 1 (PRIOR ART)
FIG. 1 illustrates an exemplary simplified schematic diagram of a circuit for a pixel of a liquid crystal display in accordance with the prior art.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Exemplary embodiments of the present invention provide a solution to the increasing challenges inherent in efficiently driving display panels while preventing undesirable visual display experiences such as flickering, and other visual artifacts. Exemplary embodiments of the present invention can take advantage of the natural tendency of display interfaces to be arranged in odd/even horizontal pixel striping, e.g., pixel columns, with odd columns and even columns. Pixels can be alternated on each channel or lane to decrease interface bandwidth e.g., Odd/Even channels in a Dual-Channel LVDS interface can be arranged to send horizontally adjacent odd/even pixels. Spreading the pixels allows a higher effective pixel rate at the same interface clock speed, separating odd/even pixels into odd/even interface channels. Similarly on eDP interfaces the pixels are interleaved over the lanes, e.g., columns, to spread the bandwidth required over the lanes.

In one exemplary embodiment, utilizing a two-channel interface, if one channel of the interface is shutdown for one frame, and only one channel is left alive, then only the one column of pixels is being provided and thus only one column of pixels needs to be driven. Similarly if only one column of pixels is being driven on the LCD, then the LVDS interface power and LCD driver power can be halved. By alternating which channel is shutdown, to coincide with alternate frames, a form of horizontal interlacing is created wherein odd columns can be driven for a frame N and even columns can be driven for a frame N+1 and then repeated for all frames in this fashion. Such an exemplary approach relies on the storage capacitors of the TFT cells to hold their pixel values for a given frame in the columns not being updated so that the color values decay on only half of the screen at any one time. Additionally, since alternate pixels in such an embodiment are being painted next to unpainted pixels, the visual artifacts of a decaying TFT capacitor charge can be decreased by relying on the visual proximity of horizontally adjacent pixels to average out the effects of the pixel sawtooth discharge curve. Therefore refresh rates during screen idle can be drastically reduced in accordance with embodiments of the present invention, without unwanted visual artifacts.

In one exemplary embodiment, each channel can be operated in a single channel mode and alternatively filled with odd or even pixels only, e.g., only half the bandwidth would be required to display half of the pixels, so only one channel is needed. As discussed in detail below, unlike conventional interlacing techniques this exemplary approach leverages the natural arrangement of pixel channels in LCD displays, allowing a simpler implementation that alternates turning on/off channels/lanes at the source rather than creating interlacing scan-out.

Figure 2:
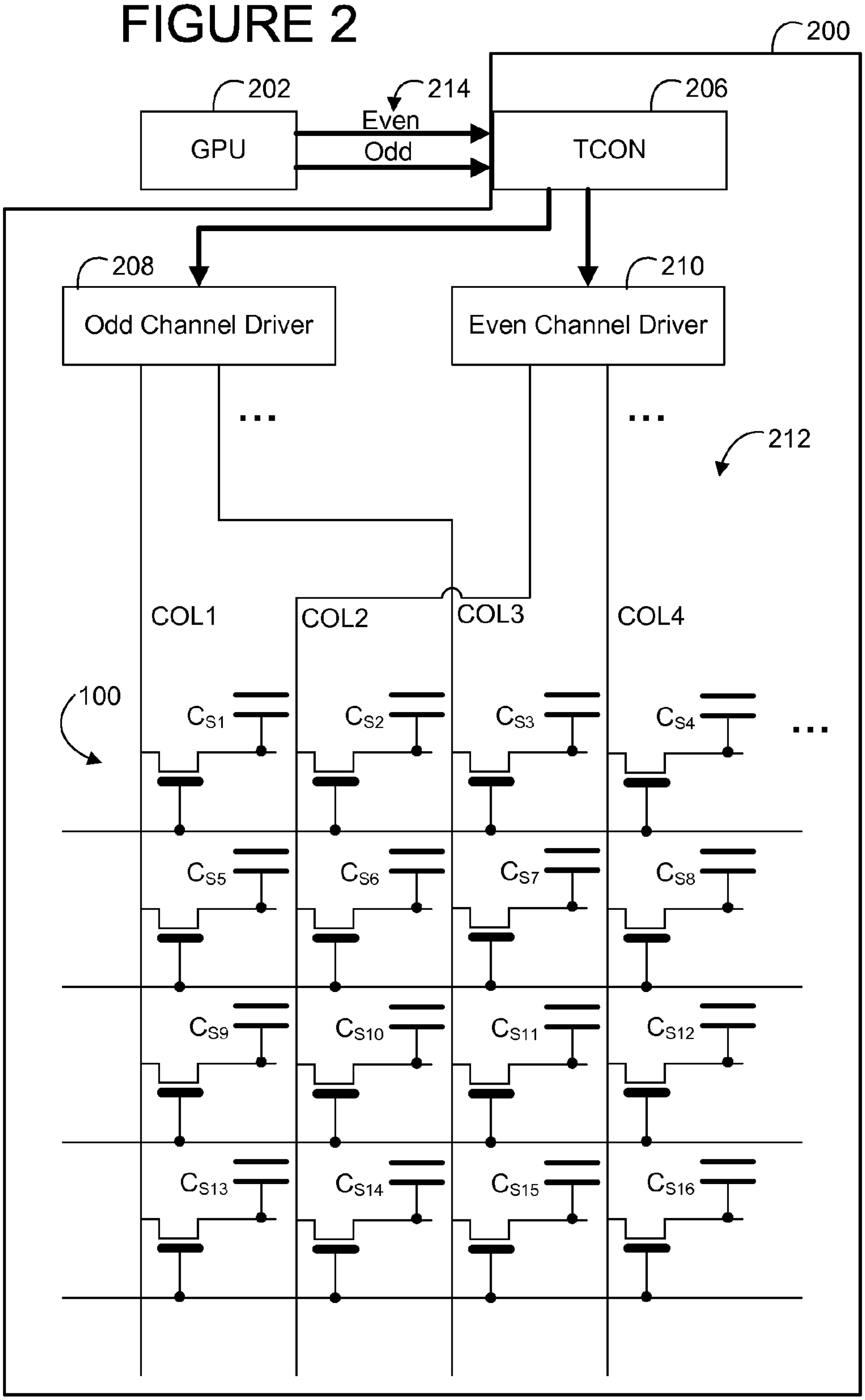
FIG. 2 illustrates an exemplary simplified schematic diagram of a display panel with efficient refreshing of a grid arrange of a plurality of pixels of the display panel in accordance with an embodiment of the present invention.

FIG. 1 illustrates an exemplary embodiment of a thin-film-transfer (TFT) element 100 making up a display element of a liquid crystal display (LCD) pixel. The TFT element 100, illustrated in FIG. 1, comprises a gate transistor 102, a storage capacitor 104, and a filtering capacitor coupled in parallel with the storage capacitor 104. A base of the gate transistor 102, illustrated in FIG. 1, is electrically coupled to a row (Row1) of a plurality of rows, as illustrated in FIG. 2, for selecting a row of pixels. A source/drain of the gate transistor 102 is coupled to a column (COL1) of a plurality of columns, illustrated in FIG. 2. As further illustrated in FIG. 1, the storage capacitor 104 is coupled to the gate transistor 102 via the other source/drain of the gate transistor 102. The gate transistor 102 is enabled by a voltage applied to Row1, through a row driver. A voltage applied to COL1 by a column driver, as illustrated in FIG. 2, can be applied to the storage capacitor 104 to set a particular voltage level in the storage capacitor 104 and thereby set a particular pixel value for the pixel.

FIG. 2 illustrates an exemplary embodiment of a flat panel display 200. In one exemplary embodiment, the display panel 200 is an LCD display panel. In another embodiment, the display panel 200 is an organic electroluminescent display (OLED or OELED). As illustrated in FIG. 2, a graphics processing unit (GPU) 202 is communicatively coupled to the LCD display panel 200. In one exemplary embodiment, as illustrated in FIG. 2, a display panel 200 comprises a timing controller (TCON) 206, which is communicatively coupled to an odd channel driver 208 and an even channel driver 210. As further illustrated in FIG. 2, the odd channel driver 208 and the even channel driver 210 are communicatively coupled to columns (COL1-COL4) of an TFT element matrix 212, where the TFT element matrix 212 makes up the pixels of the display panel 200. Each of the TFT elements 100, illustrated in FIG. 2, is the same as the TFT element 100 of FIG. 1. In one exemplary embodiment, the TFT element matrix 212 is a charge hold array of pixels.

In one exemplary embodiment, a TCON 206 of the display panel 200 receives data stream(s) from the GPU 202 and controls the drivers 208, 210 that drive the TFT elements 100 in the TFT element matrix 212. As illustrated in FIG. 2 and discussed herein, the TFT elements 100 of the TFT element matrix 212 are arranged into columns (COL1-COL4). In one exemplary embodiment, the GPU 202 and the TCON 206 of the display panel 200 are communicatively coupled through an interface 214.

In one exemplary embodiment, the interface 214 is a low-voltage differential signaling (LVDS) interface. In another exemplary embodiment, the interface 214 can be a digital serial interface (DSI) or an embedded DisplayPort (eDP) interface. In one exemplary embodiment, as illustrated in FIG. 2, the interface 214 is a pair of communication links between the GPU 202 and the TCON 206, with each one of the pair of communication links corresponding to one of the odd channel driver 208 or the even channel driver 210.

Figure 3:
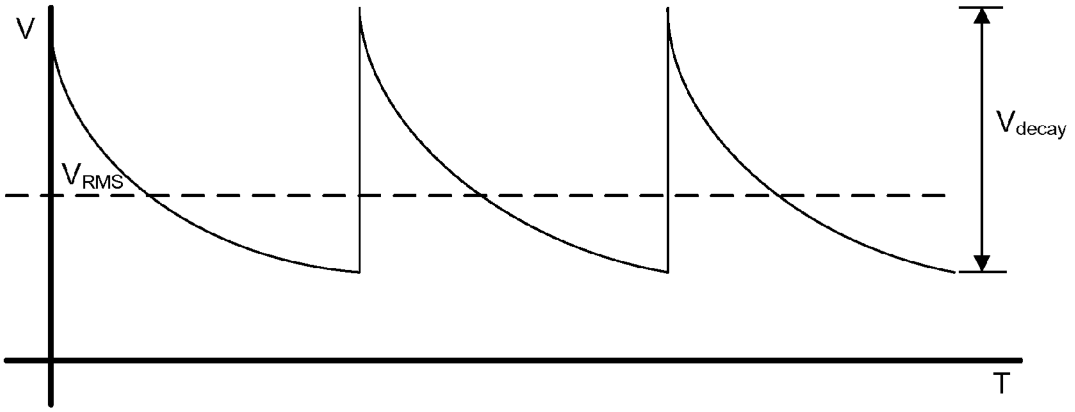
FIG. 3 illustrates a simplified plot diagram illustrating the charging and decay of a capacitor for a pixel of a display panel in accordance with an embodiment of the present invention.

As discussed herein and illustrated in FIG. 2, each of the TFT elements 100 of the TFT element matrix 212 are refreshed. The voltage level of the storage capacitor 104 of the TFT element 100, which determines the corresponding pixel's value, needs to be periodically refreshed as the voltage level of the storage capacitor 104 is subject to a voltage discharge following a saw tooth decay pattern that has a very steep sloop, as illustrated in FIG. 3. In one exemplary embodiment, the refresh rate of the TFT elements 100 is frequent enough to prevent visual artifacts. In one exemplary embodiment, the storage capacitor 104 can be of a size sufficiently small enough to support low latency displays that can reproduce high motion content. In other words, a display that can properly display video games and fast moving video content cannot make use of a storage capacitor with a larger capacitance, as the charging time of a capacitor is proportional to its capacitance. Conversely, a small storage capacitor that can be charged up quickly in order to support fast motion and pixel values that are changing on the fly will not be able to hold a charge for very long: the sloop of the saw tooth decay pattern will be directly proportional to the capacitance of the storage capacitor 104. Therefore, a storage capacitor small enough to support fast motion will also need to be frequently refreshed as it will not be able to hold its charge for very long.

Therefore, there is a fundamental problem with LCD display panels. While LCD display panels need to have small storage capacitors to support fast motion, their refresh rate must be high enough to prevent visual artifacts. However, as discussed herein, the higher the refresh rate, the higher the energy consumption of the power panel. Therefore, when a lower refresh rate is selected for energy efficiency, e.g., during screen idle, care must be taken in selecting the refresh rate because if the refresh rate is reduced too low, a strobing effect can begin to manifest because the resulting sawtooth decay is so fast. This is also illustrated in FIG. 3. Because of the small capacitance of the exemplary conventional storage capacitors, the saw tooth decay ($V_{decay}$) is large enough that the decay/recharging cycle can produce a visually disturbing strobing effect or artifact. For example, if the refresh rate is set to some exemplary refresh rate below 40 Hz, such a long resulting refresh rate can produce two problems: the actual $V_{RMS}$ color value will decrease, and the swing ($V_{decay}$) that is induced is very large. Furthermore, if there is an external light source, such as a fluorescent light running at a counter frequency, it will induce the above described strobing effect.

Reducing Panel Power Through Horizontal Interlaced Addressing:

In one exemplary embodiment, alternating which pixels will be refreshed can be used to reduce the amount of power required to refresh the TFT elements 100 of the display panel 200, e.g., during periods of screen idle. In one exemplary embodiment, these periods of screen idle can be detected by performed an inter-frame comparison of two frames. Such an inter-frame comparison can be performed by an inter-frame comparator in the GPU 202 that compares two frames. If detected differences between the two frames are below a threshold, then the display panel 200 is determined to be idle. In one exemplary embodiment, the threshold is any change between the two frames, such that when the two frames are identical, the display panel is idle. In another exemplary embodiment, some amount of difference between the two frames can be below the threshold. In other words, the display panel can still be considered idle even when the two frames aren't identical, so long as the differences between the compared frames are below the threshold. In one exemplary embodiment, the difference threshold can be user adjustable. Such a difference threshold allows for a low-power display refresh when the differences between frames are sufficiently low, such as when only a portion of the display screen in a new frame will be changed as compared to the previous frame. In one exemplary embodiment, the two frames are consecutive frames. In one exemplary embodiment, the two frames are not consecutive frames.

In one exemplary embodiment, the refresh rate for the display panel 200 can be reduced by alternating which column or row of pixels is to be refreshed. In one exemplary embodiment, illustrated in FIG. 4A, a TCON 406 in accordance with the present invention alternates which column (COL1-COL4) of pixels is to be refreshed from frame to frame.

Figure 4A:
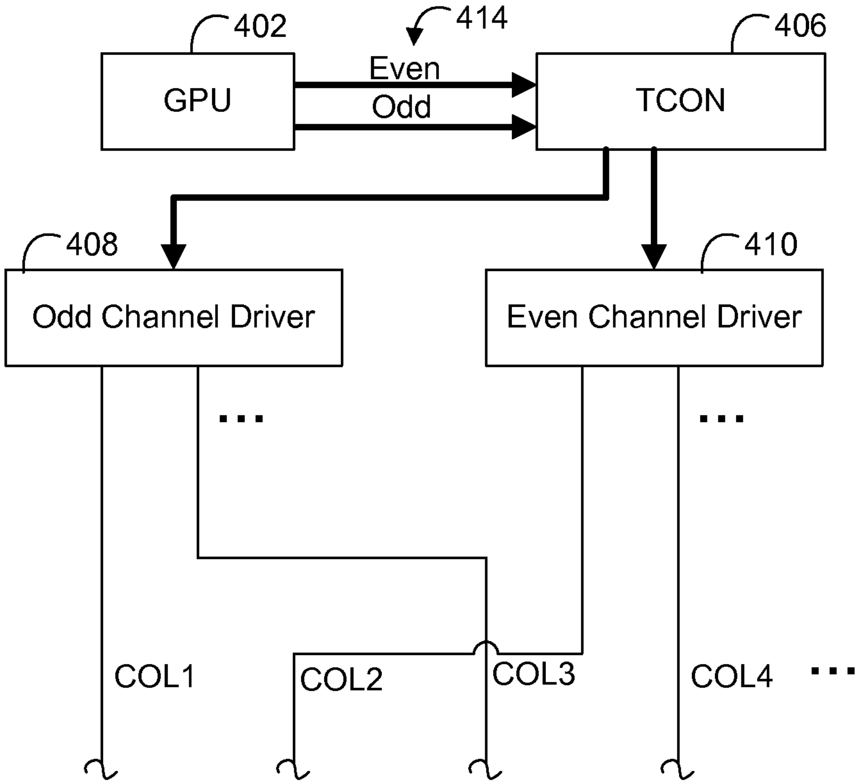
FIG. 4A illustrates an exemplary simplified schematic diagram of a display panel with efficient refreshing of a grid arrange of a plurality of pixels of the display panel utilizing only one channel at a time in accordance with an embodiment of the present invention.

In one embodiment, the interface 414, illustrated in FIG. 4A, is an LVDS interface 414 which can be arranged with a dual odd/even channel configuration. As further illustrated in FIG. 4A, the interface 414 comprises an odd channel and an even channel, with the odd pixel data on the odd channel and the even pixel data on the even channel. While in a conventional configuration the TCON 206 would send through the odd and even pixel data to the odd and even drivers (208, 210) in parallel, in one exemplary energy conserving embodiment, the TCON 406 alternates between the even channel and the odd channel from frame to frame. In accordance with one exemplary embodiment of the present invention, the interface 414 and the TCON 406 can achieve double the bandwidth with half the clock frequency by spreading the refreshed columns across the display. This means that, for instance, during display idle periods, the refresh rate on the display can be reduced to 30 Hz without visual artifacts, e.g., flicker.

In the conventional configuration, illustrated in FIG. 2, every time the TCON 206 refreshes, horizontally adjacent pixels (an odd and even pixel) are refreshed. Since these odd and even pixels (each on a corresponding odd or even column) are horizontally adjacent, in accordance with one exemplary embodiment of the present invention, one of the channels (odd or even) of the interface 414 can be advantageously turned off and the TCON 406 will pass on only the odd or even pixel data to the odd channel driver 408 or the even channel driver 410, respectively. In one exemplary embodiment, the interface 414 and TCON 406 will drive the odd channel of pixel data via the odd channel driver 408 to the odd columns COL1, COL3 during a first refresh cycle and then in a next refresh cycle, the interface 414 and TCON 406 will drive the even channel of pixel data via the even channel driver 410 to the even columns COL2, COL4. In one exemplary embodiment, drivers not used for a refresh cycle can be turned off. As illustrated in FIG. 4A, the interface 414 has both an odd channel (Odd) and an even channel (Even), but the TCON 406 alternates between which channel (odd or even) will be driven to the corresponding pixel columns (odd or even). In one exemplary embodiment of the present invention, each time the display panel 200 is painted during a refresh cycle, only half the pixels are refreshed (just the odd or even columns of pixels, not both). Therefore, embodiments of the present invention reduce the interface power because the TCON 406 is only having to drive one of the two channels at a time while the other is powered down (and thus reducing the power requirement by half).

In one exemplary embodiment, the TCON 406 is configured to recognize a power saving mode in accordance with the embodiments of the present invention. In one exemplary embodiment, the TCON 406 will only address the pixels corresponding to the enabled channel (odd or even) for the active columns (the columns receiving the data). In one exemplary embodiment, if the TCON 406 does not receive data from the interface 414 for a particular channel (odd or even), then the columns corresponding to that channel will not be driven. In one exemplary embodiment, the TCON 406 will only drive a column (odd or even) when its corresponding channel is active. In one embodiment, the TCON 406 only drives the corresponding column. For example, if the even channel is enabled, only the even columns of pixels will be driven. Therefore, if the odd channel is disabled, the odd channel driver 408 will not write out zeros to the odd columns of pixels. Even if zeroes are found on the odd channel (which is disabled this refresh cycle), those zeroes will not be driven to the odd columns of pixels. In one exemplary embodiment, only the selected corresponding channel will drive pixels, while the other unselected channel will be quiescent, relying on the storage capacitance of the corresponding pixels to maintain their charges in the undriven columns of pixels. While the pixels in the odd columns are being driven (refreshed), the pixels in the even columns will be in decay, but with the discharge period of the decaying pixels short enough that the stored pixel information in the storage capacitor will not be lost.

As noted above, the strobing effect can be caused by having a large enough area of the display panel pulsing at the same time. In an embodiment of the present invention, only half the display panel will be pulsing at the same time. Such an embodiment can make the pulsing/strobing effect less noticeable. This averaging or distributing of the effect across the panel can make the effect that much less visually noticeable to an observer.

Figure 4B:
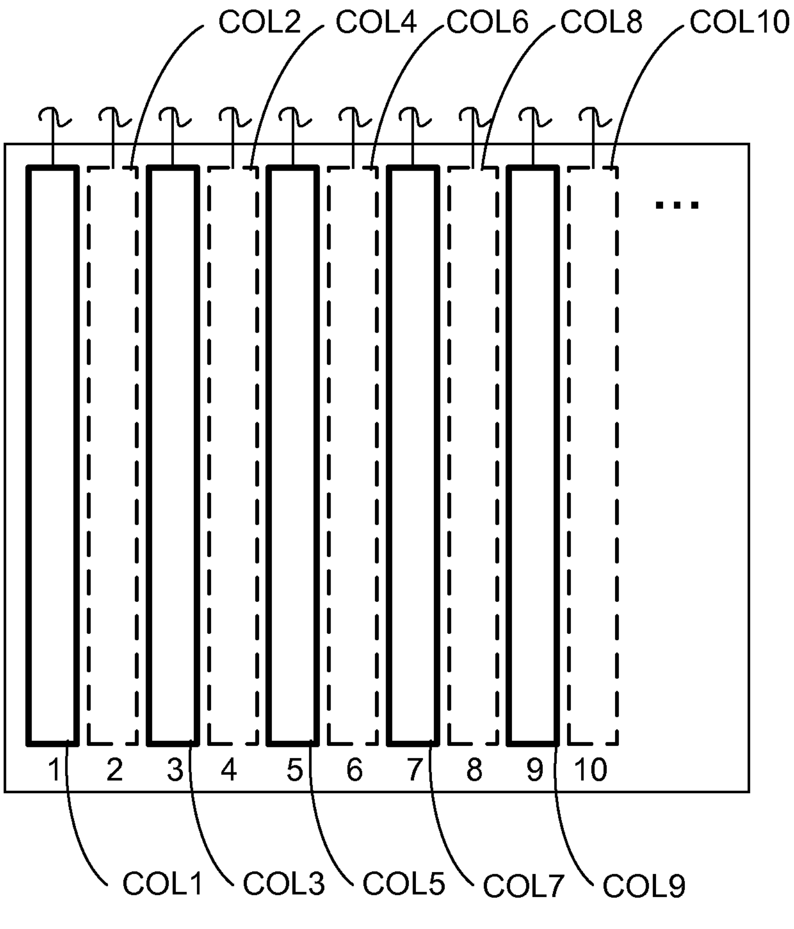
FIG. 4B illustrates an exemplary simplified schematic diagram of a display panel with efficient refreshing of alternating (odd/even) columns of pixels of the display panel in accordance with an embodiment of the present invention.
Figure 4C:
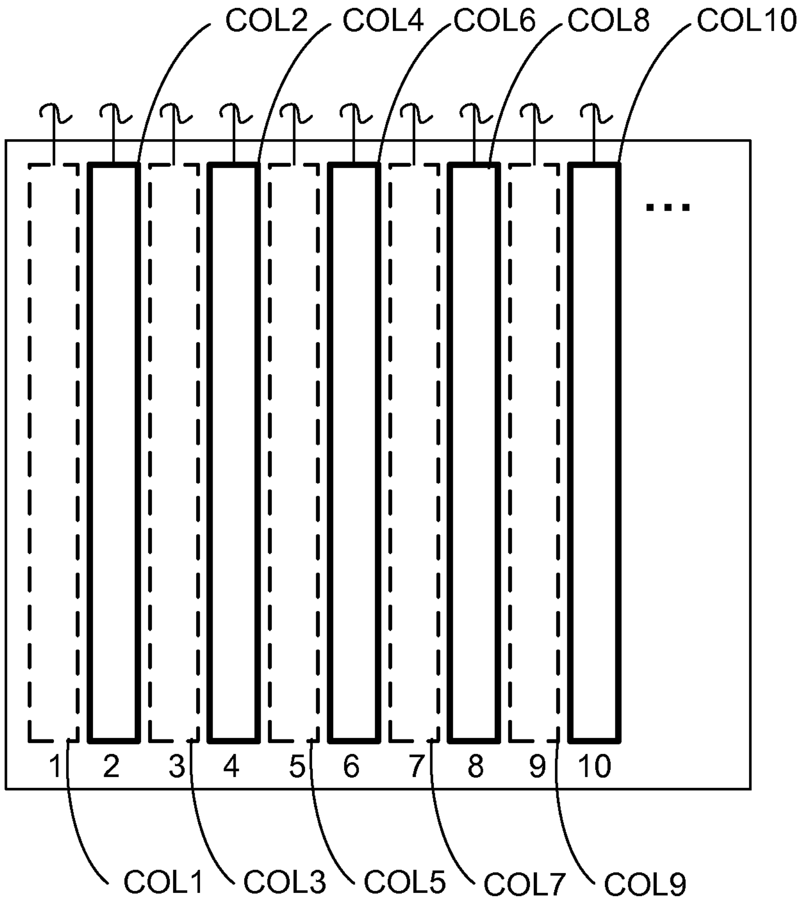
FIG. 4C illustrates an exemplary simplified schematic diagram of a display panel with efficient refreshing of alternating (odd/even) columns of pixels of the display panel in accordance with an embodiment of the present invention.

In one exemplary embodiment as illustrated in FIG. 4B, when the odd channel driver 408 is driving the odd columns (COL1-COL9) of pixels to refresh the odd columns (COL1-COL9) of pixels during a frame N, the even columns (COL2-COL10) of pixels are not being driven (refreshed) and will instead be in decay for frame N. Therefore, as illustrated in FIG. 4C, when the even channel driver 410 is driving the even columns (COL2-COL10) of pixels to refresh the even columns (COL2-COL10) of pixels during a frame N+1, the odd columns (COL1-COL9) of pixels are not being driven (refreshed) and will instead be in decay for frame N+1. As illustrated in FIGS. 4B and 4C, when a column of pixels is not being driven for a frame, the column of pixels will be in decay for that frame.

Adjusting the VRMS to Compensate for Horizontal Interlacing:

In one exemplary embodiment, the refresh rate of an individual pixel is half the rate of the refresh cycle, therefore, the pixel will be driven less often, with the pixel possibility appearing less bright on the display panel. In other words, the RMS average would be lowered. Therefore, the pixel may need to be driven to a higher potential/voltage in order to compensate for the overall reduction in RMS brightness, where the RMS is the root mean square average of the pixel waveform illustrated in FIG. 3. In one exemplary embodiment, the pixel luminance level can be compensated in one of several ways: a $V_{RMS}$ compensation can be performed inside the TCON 406, the $V_{RMS}$ compensation can be performed in the individual pixel as the pixel is being driven by the GPU (and using higher pixel values), or the $V_{RMS}$ compensation can be performed by the corresponding driver for the pixel.

Figure 5A:
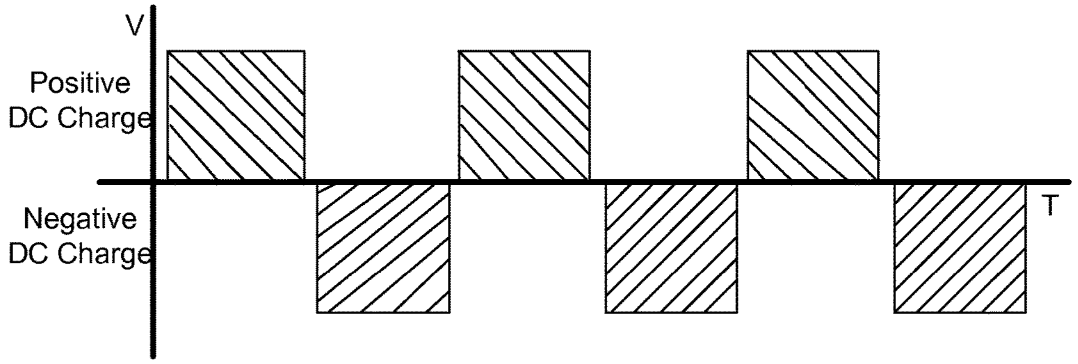
FIG. 5A illustrates an exemplary simplified timing diagram illustrating the changing polarity of the driving change to the storage capacitors in accordance with an embodiment of the present invention.

Preventing DC Residual Artifact:

As illustrated in FIG. 5A, the field of an LCD display panel can be inverted every other refresh cycle. As discussed herein, a pixel's storage capacitor is being driven to some voltage level. As illustrated in FIG. 5A, this voltage level will be inverted every other frame. This inversion of the voltage polarity is performed so that the LCD display panel will not receive a net DC charge buildup in the pixels which would produce visual artifacts. In other words, if the channel drivers continued driving a DC charge with a single polarity, a residual DC charge would begin to build up over time, producing a DC charge buildup artifact in the pixels' storage capacitors, such that if the pixel information changed, the residual DC buildup would remain and possibly effect the new image being displayed. Therefore, to combat the residual DC buildup, the field is inverted: every other frame the field is inverted, as illustrated in FIG. 5A.

Figure 5B:
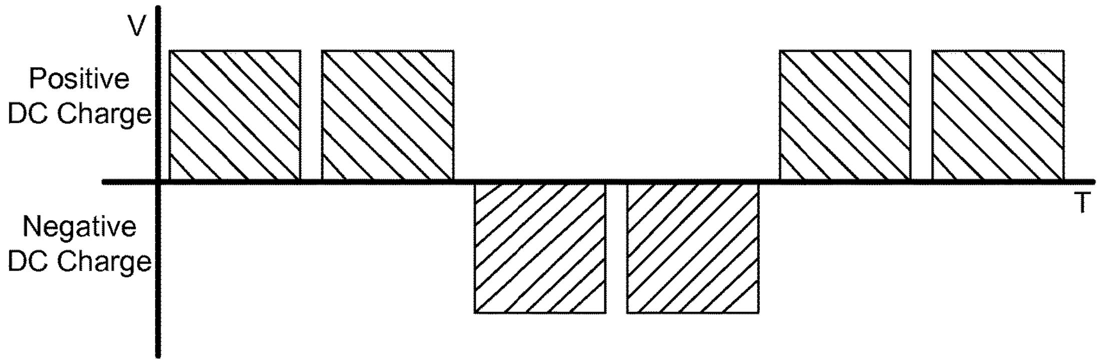
FIG. 5B illustrates an exemplary simplified timing diagram illustrating the changing polarity of the driving change to the storage capacitors in accordance with an embodiment of the present invention.

However, as illustrated in FIG. 5B, a different polarity cycle is followed for embodiments of the present invention. Such a change is required because only the odd or only the even columns are driven at a time, not simultaneously. Therefore, following the conventional polarity cycle, as illustrated in FIG. 5A, the exemplary odd columns could be driven positive and the exemplary even columns could be driven negative, with each pixel then being subjected to the risk of the above mentioned DC charge buildup artifact. In order to achieve the desired polarity cycling for embodiments of the present invention, the polarity may be cycled every two cycles, as illustrated in FIG. 5B. Such a change in polarity cycling will ensure that each column of pixels goes through polarity cycling to reduce the risk of DC charge buildup artifacts.

Figure 6:
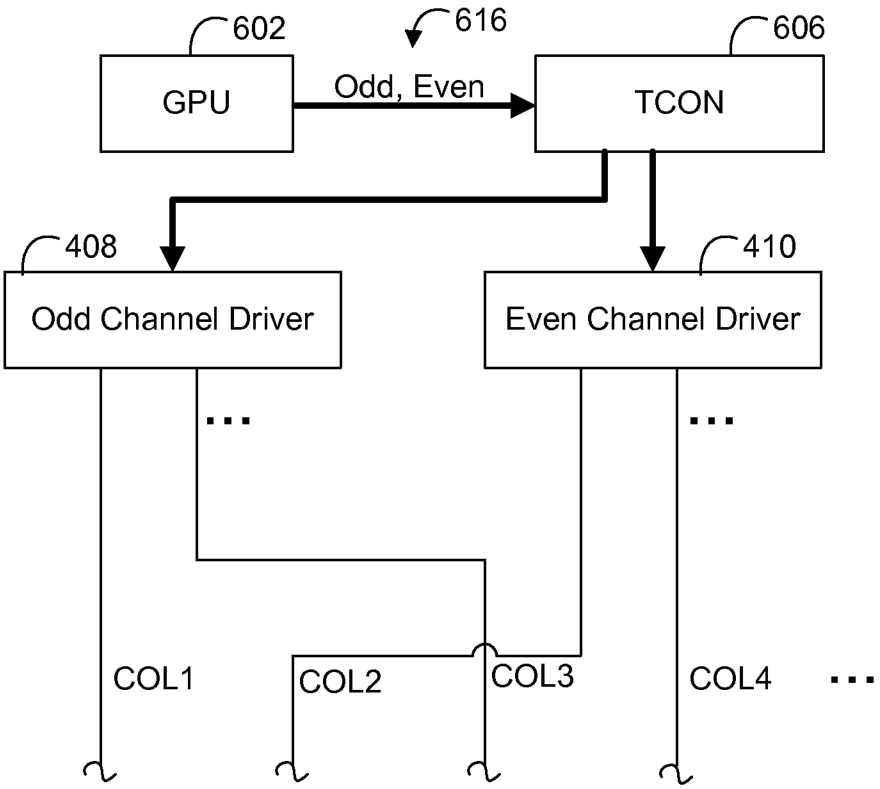
FIG. 6 illustrates an exemplary simplified schematic diagram of a display panel with efficient refreshing of a grid arrange of a plurality of pixels of the display panel utilizing only a single channel in accordance with an embodiment of the present invention.

Reducing Panel Power Through Horizontal Interlaced Addressing Using Only a Single Channel:

In one exemplary embodiment, as illustrated in FIG. 6, a single channel can be used, with the odd/even pixel information multiplexed at the GPU. In one exemplary embodiment, the GPU can communicate odd pixel information then even pixel information via the single channel of the interface 616. In one exemplary embodiment, a single channel mode can be used, where the channel is driven at twice the data rate in order to get out both the odd pixel data and the even pixel data with the TCON discarding the unneeded pixel data. In another exemplary embodiment, the GPU 602 can be configured to send out only the odd pixel data or only the even pixel data.

In one exemplary embodiment the TCON 406 can have a bimodal nature: where the system is either operating in a dual channel mode (odd channel and even channel) or a single channel (carrying both odd and even pixel information). As discussed above, in a single channel mode, the TCON 406 won't switch between the channels, but instead can drive the pixel information through a single channel, alternating between driving the even columns or the odd columns per frame.

In one exemplary embodiment the interface 414 is an eDP interface 414, with the odd and even pixel information arranged into one stream. Such pixel information can be arranged such that odd and even pixels are arranged sequentially in the configuration of a "lane" rather than a "channel." Therefore, with the odd and even pixel information arranged sequentially, the eDP interface 414 won't drive only the odd or even pixel information, but drives the odd and even pixel information sequentially.

In one exemplary embodiment, the interface 414 can deliver both the odd and even pixel information, with the TCON 406 discarding the pixel information that isn't needed (e.g., when driving the odd columns, the even pixel information can be discarded). While such a configuration wouldn't reduce the link power (that power used by the interface 414 to communicate the pixel information from the GPU to the TCON), the link power can be fairly small in comparison to the power saved in the display panel by only driving half the pixel columns at a time. In one exemplary embodiment the interface links consume 150 mW.

In one exemplary embodiment when driving only the odd or even columns, the GPU is only reading the associated odd or even pixel information from a frame buffer. Such a configuration could reduce the power required by the GPU and the frame buffer interface. Furthermore, this configuration would be able to save power from the frame buffer to the GPU, from the GPU to the TCON (via the interface), from the TCON to the drivers and from the drivers to the columns of pixels (and their storage capacitors).

In one exemplary embodiment, a refresh rate can be about 60 Hz with an individual channel being driven at 30 Hz (half the rate of the display panel, as each column is only driven every other refresh cycle).

Figure 7:
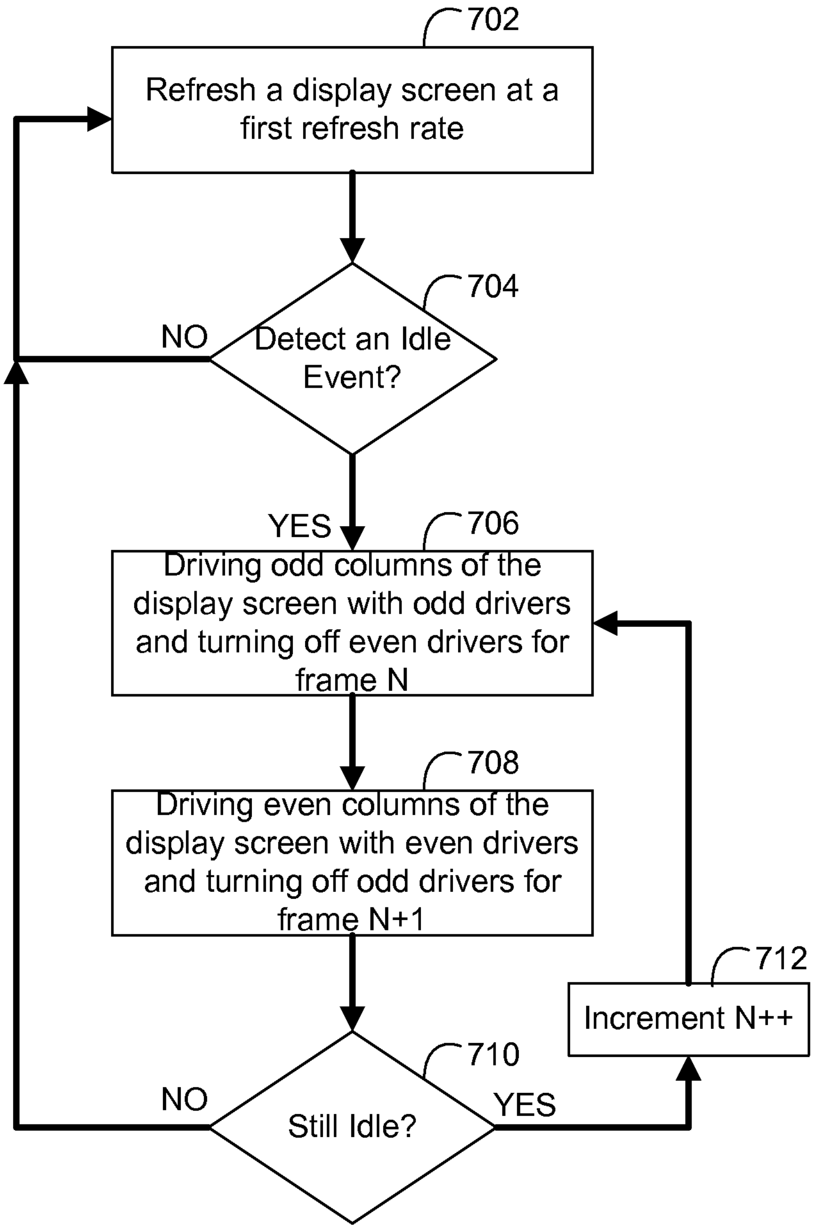
FIG. 7 illustrates a flow diagram, illustrating the steps to a method in accordance with an embodiment of the present invention.

FIG. 7 illustrates an exemplary flow diagram of a method for refreshing a display panel. In step 702 of FIG. 7, a display screen is refreshed at a first refresh rate. In step 702, the odd and even columns of pixels of the display screen are refreshed each frame at the first refresh rate. In step 704 of FIG. 7, an idle event determination is made. In one exemplary embodiment, the idle event detection can be performed by an inter-frame comparator in a graphics processor that compares two frames of display data. If detected differences between the two frames are below a threshold, then the display system is determined to be idle. In one exemplary embodiment, the threshold is any change between the two frames, such that when the two frames are identical, the display system is idle. In another exemplary embodiment, some amount of difference between the two frames can be below the threshold. In other words, the display system can still be in the display idle state even when the two frames aren't identical, so long as the differences are below the threshold. In one exemplary embodiment, the two frames are consecutive frames. In one exemplary embodiment, the two frames are not consecutive frames.

In step 704 of FIG. 7, if an idle event is not detected, the method progresses and returns to step 702. In step 704 of FIG. 7, if an idle event is detected, the method progresses to step 706 of FIG. 7. In step 706, the odd columns of pixels of the display screen are driven to refresh the odd columns of pixels for frame N. In step 706, while the odd columns of pixels are refreshed, the even drivers are turned off during frame N, such that the even columns of pixels are in decay. After refreshing the display screen during frame N, the method progresses to step 708 of FIG. 7.

In step 708 of FIG. 7, the even columns of pixels of the display screen are driven to refresh the even columns of pixels for frame N+1. In step 708, while the even columns of pixels are refreshed, the odd drivers are turned off during frame N+1, such that the odd columns of pixels are in decay. After refreshing the display screen during frame N+1, the method progresses to step 710.

In step 710 of FIG. 7, an idle event determination is made. As illustrated in FIG. 7, if the display screen is no longer in a display idle state, then the method progresses back to step 702 to refresh both the odd and even columns of pixels each frame at the first refresh rate. If the display screen is still in a display idle state in step 710, then the method increments the count N in step 712 such that frame N in step 706 will now be N+2.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of display refresh, said method comprising:

refreshing even and odd columns of a display panel at a first frame refresh rate wherein, for each frame, even and odd columns are refreshed and pixel data of said even and odd columns are read out from a frame buffer coupled to a graphics processor, and wherein each column of said even and odd columns corresponds to a respective data line, wherein said refreshing said even and odd columns at said first frame refresh rate comprises driving a plurality of pixels of said even and odd columns to respective first voltage levels; and upon entering a display idle period, performing low power display refresh comprising:

refreshing said even columns of said display during even frames, wherein for each even frame, circuitry driving odd columns is not used and only pixel data of said even columns are read out from said frame buffer; and refreshing said odd columns of said display during odd frames, wherein for each odd frame, circuitry driving said even columns is not used and only pixel data of said odd columns are read out from said frame buffer, wherein said refreshing said even columns and said refreshing said odd columns are performed at a second frame refresh rate that is slower than said first frame refresh rate with pixel brightness compensation for a difference between said second frame refresh rate and said first frame refresh rate, wherein said pixel brightness compensation comprises driving said plurality of pixels of said even and odd columns to respective second voltage levels, and wherein said second voltage levels are greater than said respective first voltage levels.

2. The method as described in claim 1 wherein said first frame refresh rate is 40 Hz or greater and wherein said second frame refresh rate is 30 Hz or lower.

3. The method as described in claim 1 further comprising entering said display idle period upon detection of still frames.

4. The method as described in claim 1 further comprising entering said display idle period when a detected difference between consecutive frames is below a threshold.

5. The method as described in claim 1 wherein, during said refreshing said odd columns of said display, said circuitry driving said even columns is turned off, and wherein further, during said refreshing said even columns of said display, said circuitry driving said odd columns is turned off.

6. The method as described in claim 1, wherein said pixel brightness compensation is based on a root mean square average of a pixel voltage variation during a refresh cycle.

7. A computer system comprising:

a plurality of odd columns of a display panel;

a plurality of even columns of said display panel;

a circuitry for generating data driving signals operable to drive odd columns;

a circuitry for generating data driving signals operable to drive even columns, wherein each column of said odd columns and said even columns corresponds to a respective data line;

a frame buffer;

a graphics processor coupled to the frame buffer;

a processor and a memory for storing instructions that when executed by the processor perform a display refresh method comprising:

refreshing said even and said odd columns at a first frame refresh rate, wherein said refreshing said even and odd columns at said first frame refresh rate comprises driving a plurality of pixels of said even and odd columns to respective first voltage levels, and wherein, for each frame, even and odd columns are refreshed and pixel data of said even and said odd columns are readout from said frame buffer; and upon entering a display idle period, performing low power display refresh comprising:

refreshing said even columns of said display during even frames, wherein, for each even frame, said circuitry operable to drive said odd columns are not, used and only pixel data of said even columns are read out from said frame buffer; and refreshing said odd columns of said display during odd frames, wherein, for each odd frame said circuitry operable to drive said even columns are not used and only pixel data of said odd columns are read out from said frame buffer wherein said refreshing said even columns and said refreshing said odd columns are performed at a second frame refresh rate that is slower than said first frame refresh rate with pixel brightness compensation for a difference between said second frame refresh rate and said first frame refresh rate, wherein said pixel voltage brightness compensation comprises driving said plurality of pixels of said even and odd columns to respective second voltage levels, and wherein said second voltage levels are greater than said respective first voltage levels.

8. The computer system as described in claim 7 wherein said first frame refresh rate is 40 Hz or greater and wherein said second frame refresh rate is 30 Hz or lower.

9. The computer system as described in claim 7, wherein the display refresh method further comprises entering said display idle period upon detection of still frames.

10. The computer system as described in claim 7, wherein the display refresh method further comprises entering said display idle period when a detected difference between consecutive frames is below a threshold.

11. The computer system as described in claim 7, wherein, during said refreshing said odd columns of said display, said circuitry driving said even columns is turned off, and wherein further, during said refreshing said even columns of said display, said circuitry driving said odd columns is turned off.

12. The computer system as described in claim 7, wherein said pixel brightness compensation is based on a root mean square average of a pixel voltage variation during a refresh cycle.

13. A computer system comprising:

a frame buffer;

a graphics processor coupled to the frame buffer;

a plurality of odd columns of a display panel that are refreshed by a circuitry for driving said odd columns;

a plurality of even columns of said display panel that are refreshed by a circuitry for driving said even columns, wherein each column of said even columns and said odd columns corresponds to a respective data line;

an inter-frame comparator operable to detect a display idle period; and a refresh controller operable to select a refresh mode, wherein a first refresh mode for refreshing even and odd columns each frame at a first frame refresh rate is selected when said display idle period is not detected, wherein for said first refresh mode, the refresh controller is further operable to drive a plurality of pixels of said even and odd columns to respective first voltage levels; and wherein upon entering said display idle period, said refresh controller is further operable to select a second refresh mode for refreshing said even columns of said display during, even frames while said circuitry driving odd columns are not used and only pixel data for said even columns are read out from said frame buffer, and for refreshing said odd columns of said display during odd frames while said circuitry driving said even columns are not used and only pixel data for said odd columns are read out from said frame buffer, and wherein for said second refresh mode: said refreshing said even columns and said refreshing said odd columns are performed at a second frame refresh rate that is slower than said first frame refresh rate; and the refresh controller is further operable to perform pixel brightness compensation for a difference between said second frame refresh rate and said first frame refresh rate, wherein said pixel brightness compensation comprises driving said plurality of pixels of said even and odd columns to respective second voltage levels that are greater than said first voltage levels.

14. The computer system as described in claim 13 wherein said first frame refresh rate is 40 Hz or greater and wherein said second frame refresh rate is 30 Hz or lower.

15. The computer system as described in claim 13, wherein detecting said display idle period comprises at least one of:

a detection of still frames; and a detected difference between consecutive frames is below a threshold.

16. The computer system as described in claim 13, wherein, during said refreshing said odd columns of said display, said circuitry driving said even columns is turned off, and wherein further during said refreshing said even columns of said display, said circuitry driving said odd columns is turned off.

17. The computer system as described in claim 13, wherein said pixel brightness compensation is based on a root mean square average of a pixel voltage variation during a refresh cycle.

* * * * *